(12) United States Patent
Sganga

(10) Patent No.: US 12,458,136 B2
(45) Date of Patent: Nov. 4, 2025

(54) REMOVABLE HINGED TOOL HOOK

(71) Applicant: Peter Sganga, Larchmont, NY (US)

(72) Inventor: Peter Sganga, Larchmont, NY (US)

( * ) Notice: Subject to any disclaimer, the term of this patent is extended or adjusted under 35 U.S.C. 154(b) by 19 days.

(21) Appl. No.: 18/427,649

(22) Filed: Jan. 30, 2024

(65) Prior Publication Data

US 2024/0292943 A1 Sep. 5, 2024

Related U.S. Application Data

(60) Provisional application No. 63/442,880, filed on Feb. 2, 2023.

(51) Int. Cl.
*A46B 17/00* (2006.01)
*B44D 3/12* (2006.01)
*F16M 13/02* (2006.01)

(52) U.S. Cl.
CPC .............. *A46B 17/00* (2013.01); *B44D 3/123* (2013.01); *F16M 13/02* (2013.01); *A46B 2200/202* (2013.01)

(58) Field of Classification Search
CPC .. A46B 17/00; A46B 2200/202; B44D 3/123; F16M 13/02; F16B 45/02; F16B 45/021; F16B 45/022; F16B 45/023
USPC ....... 248/690, 691, 692, 113, 339, 340, 341, 248/301, 304, 305, 306
See application file for complete search history.

(56) References Cited

U.S. PATENT DOCUMENTS

| 4,328,917 | A | | 5/1982 | Reeberg | |
|---|---|---|---|---|---|
| 4,386,724 | A | | 6/1983 | Kotler | |
| 5,044,038 | A | * | 9/1991 | Matkovic | B44D 3/123 |
| | | | | | 248/692 |
| 5,743,451 | A | * | 4/1998 | Kahn | A45F 5/02 |
| | | | | | 224/904 |
| 5,788,132 | A | | 8/1998 | Kuruc, Jr. | |
| 5,941,434 | A | | 8/1999 | Green | |
| 8,070,027 | B2 | | 12/2011 | Piatt, Sr. | |
| 2004/0050888 | A1 | | 3/2004 | Warner | |
| 2007/0181621 | A1 | | 8/2007 | Piatt | |
| 2020/0305591 | A1 | * | 10/2020 | Byrne | A46B 17/04 |
| 2021/0023876 | A1 | * | 1/2021 | Sganga | A46B 17/02 |

* cited by examiner

*Primary Examiner* — Alfred J Wujciak
(74) *Attorney, Agent, or Firm* — Notaro, Michalos & Zaccaria P.C.; John S. Economou

(57) ABSTRACT

In some aspects, the removable hinged tool hook may include a device for coupling to a tool (such as a flexible elastic fabric band). Also, the removable hinged tool hook may include an inner member with an aperture therein. Furthermore, the removable hinged tool hook may include a hook member having an upper portion with an aperture therein, an elongated member extending downward from the upper portion, and at least one hook extension extending outward from a distal end of the elongated member. In addition, the removable hinged tool hook may include a hinge member for coupling the hook member and the inner member to the device for coupling to a tool, the hinge member passing sequentially through the aperture in the hook member and the aperture in the inner member and secured to the device for coupling to a tool.

5 Claims, 2 Drawing Sheets

REMOVABLE HINGED TOOL HOOK

CROSS-REFERENCE TO RELATED APPLICATION

This patent application claims priority to U.S. Provisional Patent Application No. 63/442,880, filed on Feb. 2, 2023, and entitled "A hinged hook to be placed securely and can be removeable on any tool for the purpose of safely hanging the tool when in use or storage." The disclosure of the prior application is considered part of and is incorporated by reference into this patent application.

FIELD

The present invention relates to a removable hinged tool hook, and more particularly to a removable hinged tool hook that can be quickly attached to a tool so that the tool can be safely secured when in use or in storage.

BACKGROUND

Paint brushes and other tools have been in use for a very long time, and, during use, may need to be put down somewhere during use. This may occur, for example, when a painter is ascending or descending a ladder or when changing between paint brushes. Although solutions exist for securing a paint brush temporarily to its own paint can, such solutions are based on hangers which are only on one side of the brush handle and are not easily moved between the open and closed position. Such solutions are thus inefficient and awkward to open and close, e.g., when a left-handed painter uses a sash brush with angled bristles, the hanger may either be in the way or simply on the wrong side of the brush handle. Such a painter may be forced to change the hand holding the paint brush in order to expose the hanger, which can be difficult if the painter is on a ladder.

Accordingly, there is a need for an improved way to provide a hook to an existing tool which overcomes such problems.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure describes a removable hinged hook for safely securing a hand tool when in use or in storage which, when placed on the tool itself will allow the tool to remain secured to whatever hooked to. The removable hinged hook of the present disclosure deploys and retracts using only one hand and, because it rotates to either side of the tool, can be used by both a right-handed person and a left-handed person.

Figure 1:
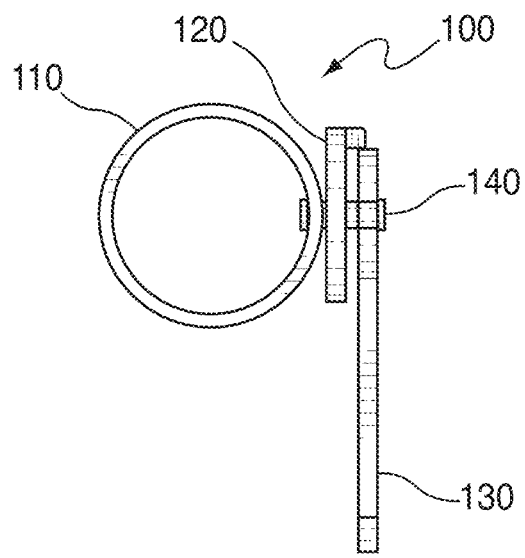
FIG. 1 is a side view of a removable hinged tool hook of the present disclosure.
Figure 2:
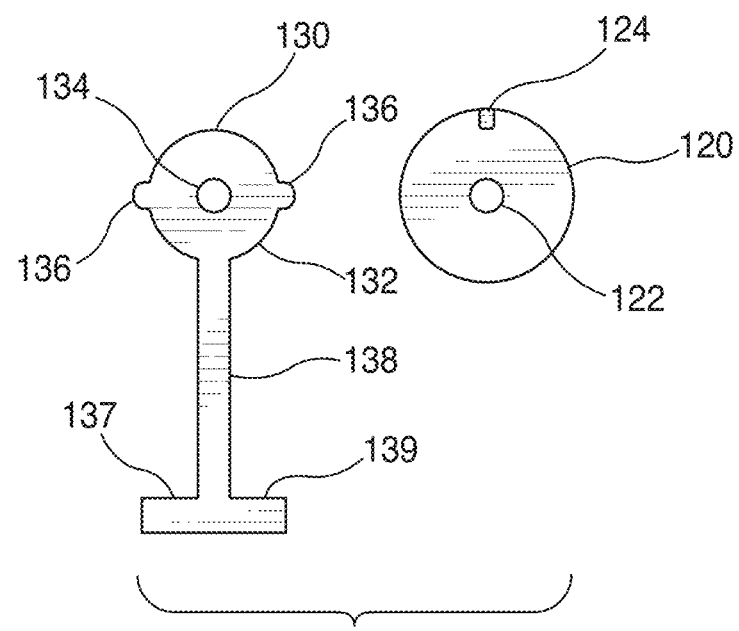
FIG. 2 is a front view of parts of the removable hinged tool hook of the present disclosure.

Referring now to FIGS. 1 and 2, in a first embodiment a removable hinged hook 100 includes a band portion 110, an inner member 120, an outer hook member 130, and a hinge member 140.

The band portion 110 may be an elastic fabric that allows the removable hinged hook 100 to be coupled to a tool by sliding the band portion 110 over the desired portion of the tool (e.g., a paintbrush handle). In one alternative, the band portion 110 may consist of two parts forming a hook-and-loop fastener as known in the art. In another alternative, the band portion 110 may consist of a cable tie (zip tie) that is coupled to the inner member 120 that can be secured around a tool. In a still further alternative, the band portion 110 may consist of a band clamp that is coupled to the inner member 120 that can be secured around a tool.

The inner member 120 is preferably circular (disk shaped) with an aperture 122 that is preferably centrally located therein and optionally a front facing extension 124 extending slightly downward from a center top position of the inner member 120.

The hook member 130 includes an upper portion 132 that is generally round with an aperture 134 that is preferably centrally located therein, an elongated member 138 that extends downward from the upper portion 132, and two outward facing hook members 137, 139, each extending outward from the distal end of elongated member 138 in opposite directions to each other. The upper portion 132 of hook member 130 may include one or more small outward facing extensions (bumps) 136 (two are shown in FIG. 2) on each side thereof (i.e., the outer periphery of the round upper portion). One of the two small outward facing extensions (bumps) 136 is preferably arranged at a position that is 90 degrees offset from the center top of the upper member and the other of the two small outward facing extensions (bumps) 136 is preferably arranged at a position that is 270 degrees offset from the center top of the upper member to allow 90 degrees rotation in each direction.

The hinge member 140 may be secured to the band portion 110 via an aperture therein (not shown) and then, on an outer portion of band portion 110, passes through the aperture 122 of inner member 120 and then the aperture 134 of outer hook member 130. The hinge member 140 may be a rivet or other type of mechanical faster which secures the band portion 110, inner member 120, and outer hook member to each other but in a manner which allows the hook member 130 to rotate around hinge member 140. When the band portion 110, an inner member 120, an outer hook member 130, and a hinge member 140 are mated together, as shown in FIG. 1, and the outward facing extensions 136 and/or the front facing extension 124 are not present, the outer hook member 130 can rotate completely around hinge member 140. When the band portion 110, an inner member 120, an outer hook member 130, and a hinge member 140 are mated together, as shown in FIG. 1, and the outward facing extensions 136 and the front facing extension 124 are present, one or the other of the outward facing extensions 136 and the front facing extension 124 cooperate to limit the amount that the outer hook member 130 can rotate around hinge member 140. In a further embodiment, the hinge member 140 may be a screw that passes through center apertures in the inner member 120 and the outer hook member 130 that is screwed into the handle of the tool, and which secures the inner member 120 and the outer hook member 130 to each other but in a manner which allows the hook member 130 to rotate around hinge member 140. In this further embodiment, the band portion 110 may be omitted.

Figure 3:
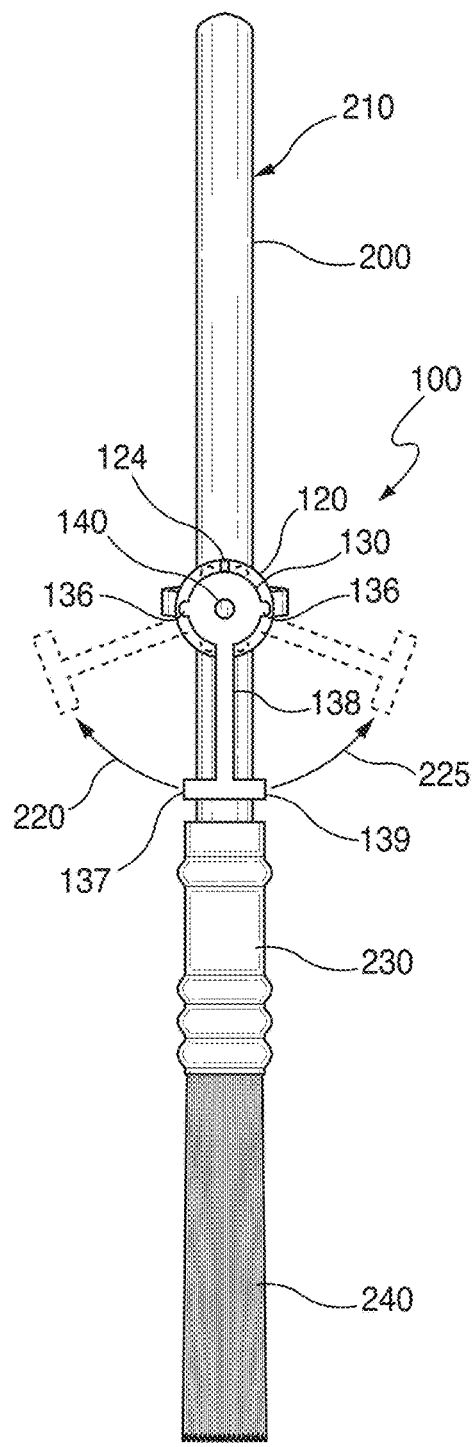
FIG. 3 is a side view of a tool (paintbrush) having the removable hinged tool hook of the present disclosure mounted thereon.

Referring now to FIG. 3, the removable hinged hook 100 is shown mounted to a handle 210 of a tool (paintbrush) 200 (which also has a ferrule portion 230 and a brush portion 240). The arrows 220 and 225 show the movement of the outer hook member 130 during use so that the tool 200 may be hooked to, for example, a rim of a paint bucket. In FIG. 3, the cooperation between the outward facing extensions 136 and the front facing extension 124 can be seen. First, as the outer hook member 130 rotates to the right (the direction of arrow 225), the right outward facing extension 136 will meet the front facing extension 124 and any further rotation will be prevented. Likewise, as the outer hook member 130 rotates to the left (the direction of arrow 220), the left outward facing extension 136 will meet the front facing extension 124 and any further rotation will be prevented.

Figure 4:
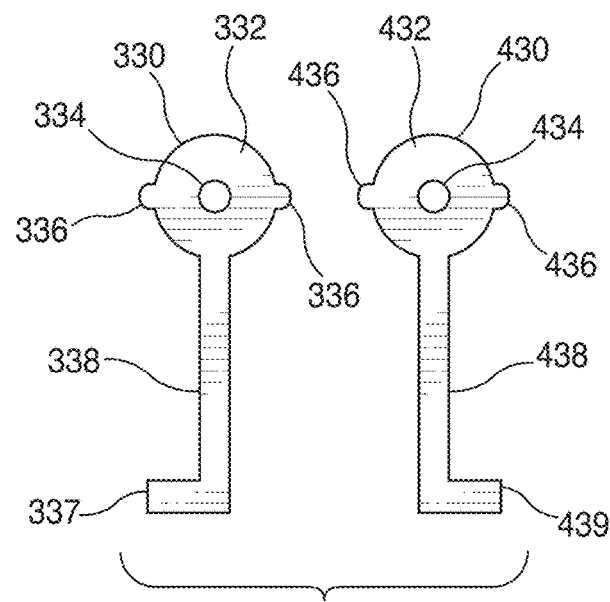
FIG. 4 is a front view of parts for a second embodiment of the present disclosure.

Referring now to FIG. 4, in a second embodiment the single outer hook member 130 of the first embodiment is replaced with two separate elements, a first outer hook member 330 and a second outer hook member 430. The first outer hook member 330 includes an upper portion 332 that is generally round with a central aperture 334, an elongated member 338 that extends downward from the upper portion 332, and a single outward facing hook member 337 extending outward to the left from the distal end of elongated member 338. The upper portion 332 of hook member 330 may include two small outward facing extensions (bumps) 336 on each side thereof (each preferably arranged 90 degrees offset from the elongated member 338 to allow 90 degrees rotation). The second outer hook member 430 includes an upper portion 432 that is generally round with a central aperture 434, an elongated member 438 that extends downward from the upper portion 432, and a single outward facing hook member 437 extending outward to the right from the distal end of elongated member 438. The upper portion 432 of hook member 430 may include two small outward facing extensions (bumps) 436 on each side thereof (each preferably arranged 90 degrees offset from the elongated member 438 to allow 90 degrees rotation). The removable hinged hook of the second embodiment is assumed in the same manner as the first embodiment, with the hinge member 140 passing through the aperture 122 of inner member 120, the aperture 334 of first outer hook member 330, and then the aperture 434 of second outer hook member 430. During use, a user may rotate a desired one of the two (first and second) outer hook members 330, 430 depending on how the tool is being held etc.

By mounting the removable hinged hook of the present disclosure on a tool as shown in FIG. 3, the hinge member 140 allows the outer hook member (or members) to rotate perpendicular to the tool handle to allow the tool to be secured to a mounting point during use (e.g., a paint can) or storage (e.g., a wall mount). The band portion 110 allows the removable hinged hook to be easily attached or removed from a hand tool by the user. The removable hinged hook ensures an easier and more intuitive way to deploy and retract the hook (or hooks) with a single hand, thereby creating a safer and more efficient tool. The removable hinged hook of the present disclosure can by mounted onto many different types hand tools, including for example: paintbrushes, taping knives, margin trowels, putty knives, utensils, medical tools, and medical devices. The removable hinged hook of the present disclosure can used during a work mode or for storage of tools.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A hook adapter for a tool, comprising:
a band portion for coupling to a tool;
an inner member with an aperture therein;
a hook member having an upper portion with an aperture therein, an elongated member extending downward from the upper portion, and at least one hook extension extending outward from a distal end of the elongated member; and
a hinge member for coupling the hook member and the inner member to the band portion for coupling to a tool, the hinge member passing sequentially through the aperture in the hook member and the aperture in the inner member and secured to the band portion for coupling to a tool; and
wherein the inner member is disk shaped and includes a front facing extension extending downward from a center top portion thereof.

2. The hook adapter of claim 1, wherein the upper member of the hook member is round and includes an outward facing extension on an outer periphery thereof, the outward facing extension interacting with the front facing extension of the inner member to limit rotation of the hook member in a first direction.

3. The hook adapter of claim 2, wherein the outward facing extension is positioned on the outer periphery of the upper member at a position that is 90 degrees offset from the center top of the upper member.

4. The hook adapter of claim 1, wherein the upper member of the hook member is round and includes two outward facing extension on an outer periphery thereof, the two outward facing extension interacting with the front facing extension of the inner member to limit rotation of the hook member in a first direction and in a second direction that is opposite to the first direction.

5. The hook adapter of claim 4, wherein one of the two outward facing extensions is positioned on the outer periphery of the upper member at a position that is 90 degrees offset from the center top of the upper member and the other of the two outward facing extensions is positioned on the outer periphery of the upper member at a position that is 270 degrees offset from the center top of the upper member.

* * * * *